United States Patent [19]
Fukumoto et al.

[11] Patent Number: 5,772,352
[45] Date of Patent: Jun. 30, 1998

[54] BALL JOINT HAVING EXTENDED SERVICE LIFE

[75] Inventors: Yasutaka Fukumoto, Toyota; Junichi Kato, Nishikamo-Gun; Yukio Okamura, Toyota; Yasuhiro Ishikawa, Nishio; Tetsuo Kondo, Nishio; Yoshimi Suzuki, Nishio; Hidetomi Nagai, Nishio, all of Japan

[73] Assignees: Toyota Jidosha Kabushiki Kaisha; Otics Corporation, both of Aichi-Ken, Japan

[21] Appl. No.: 642,061

[22] Filed: May 6, 1996

[30] Foreign Application Priority Data

Jun. 2, 1995 [JP] Japan .................................. 7-136902
Jun. 14, 1995 [JP] Japan .................................. 7-147810

[51] Int. Cl.⁶ .................................................. F16C 11/00
[52] U.S. Cl. .......................... 403/144; 403/143; 403/136; 403/138; 280/674
[58] Field of Search .................................. 403/122, 135, 403/136, 137, 138, 140, 141, 142, 143, 144; 280/673, 674

[56] References Cited

U.S. PATENT DOCUMENTS

| | | | |
|---|---|---|---|
| 1,452,530 | 4/1923 | Sherbondy | 403/138 X |
| 1,500,010 | 7/1924 | Smith et al. | 403/122 X |
| 1,928,919 | 10/1933 | Zerk | 403/136 |
| 2,973,980 | 3/1961 | Vogt et al. | 403/133 |
| 3,154,333 | 10/1964 | Townsend | 403/122 |
| 3,259,408 | 7/1966 | Herbenar | 403/138 |
| 3,539,234 | 11/1970 | Rapata | 403/122 X |
| 3,799,101 | 3/1974 | Finefrock | 114/235 A |
| 4,111,571 | 9/1978 | Farrant | 403/138 X |
| 4,695,181 | 9/1987 | Rahmede et al. | 403/135 |
| 4,863,291 | 9/1989 | Heshmat et al. | 384/305 |
| 4,971,473 | 11/1990 | Schafer et al. | 403/140 |
| 5,022,779 | 6/1991 | Schintzler | 403/138 |
| 5,152,628 | 10/1992 | Broszat et al. | 403/135 X |
| 5,154,530 | 10/1992 | Dresselhouse | 403/138 |
| 5,496,125 | 3/1996 | Maughan | 403/137 |
| 5,564,853 | 10/1996 | Maughan | 403/140 X |

FOREIGN PATENT DOCUMENTS

| | | | |
|---|---|---|---|
| 0342351A1 | 10/1989 | European Pat. Off. . | |
| 212778 | 8/1984 | Germany . | |
| 48-29022 | 9/1973 | Japan . | |
| 58-96118 | 6/1983 | Japan . | |
| 0297809 | 12/1988 | Japan | 403/135 |
| 2-74617 | 6/1990 | Japan . | |
| 3-4923 | 1/1991 | Japan . | |
| 5-5288 | 2/1993 | Japan . | |

*Primary Examiner*—Kenneth J. Dorner
*Assistant Examiner*—William L. Miller
*Attorney, Agent, or Firm*—Kenyon & Kenyon

[57] ABSTRACT

A ball joint generates play when wear of a ball sheet reaches a predetermined allowable amount so that the end of service life of the ball joint can be recognized by a simple inspection. A spherical portion of a ball stud is interposed between an upper sheet and a lower sheet. The upper sheet is displaced toward the lower sheet when the upper sheet or the lower sheet has been worn due to sliding of the spherical portion. The displacement of the upper sheet is restricted so that the upper sheet is supported at a predetermined position relative to the lower sheet.

11 Claims, 14 Drawing Sheets

BALL JOINT HAVING EXTENDED SERVICE LIFE

BACKGROUND OF THE INVENTION

1. Field of the Invention

The present invention generally relates to a ball joint and, more particularly, to a ball joint suitable for a coupling of a vehicle suspension.

2. Description of the Related Art

A ball joint is used as a coupling in a vehicle suspension. Generally, the ball joint has a stud having a spherical head on one end thereof. The spherical head is interposed between a pair of ball sheets so that the spherical head is slidable within the ball sheets which achieves a swivel motion of the ball joint. In order to provide a smooth motion of the ball stud, the spherical head of the ball stud must be retained by the ball sheets with a suitable pressure.

Such a ball joint having a suitable pressure to the spherical head is disclosed, for example, in Japanese Utility Model Publication No.5-5288. This ball joint has a pair of ball sheets, which retains a spherical head of a ball stud therebetween, engaging with each other at peripheries thereof. The ball joint of this type tends to generate a gap between the spherical head and the ball sheets. This is because the space between the ball sheets is increased due to wearing of the ball sheets, and the ball sheets cannot be moved toward each other as the peripheries of the ball sheets are engaged with each other. Accordingly, if such a gap is formed, play may be created in the motion of the ball stud, resulting in an undesirable operation of the ball joint. This may lead to a problem in that a premature determination is made that the service life of the ball joint has ended.

As a method for eliminating play in the ball joint, it is suggested to apply a pressures to the ball sheets so that the spherical head between the ball sheets is always pressed against the spherical head of the ball stud. In this case, play is not created even when the ball sheets are worn. However, if play is not created until the end of its service life, it may be difficult to determine the service life of the ball joint by a regular inspection performed on a vehicle. That is, if the ball joint is configured such that play is not created between the ball stud and the ball sheet, there is a problem in that an inspection for the ball joint may require time and labor.

The ball joint of the above-mentioned type requires a lubricant such as grease applied between the spherical head and the ball sheets so that the spherical head can move smoothly between the ball sheets and the ball sheets are prevented from being worn. Japanese Laid Open Utility Model Application No.58-96118 discloses a ball joint having such a function to properly lubricate the spherical head and the ball sheets. This ball joint comprises a ball sheet having a groove through which a lubricant is supplied from a grease retaining chamber to portions between the spherical head and the ball sheet. In this construction, a grease is supplied between the spherical head and the ball sheet, resulting in a smooth sliding motion of the spherical head.

However, in this ball joint, the amount of grease supplied through the groove is not controlled. Accordingly, if the ball joint is operated under a severe condition, the grease in the grease retaining chamber may be spent in a relatively short time. Thus, there is a problem in that a smooth motion of the spherical head may not be maintained for a long time.

SUMMARY OF THE INVENTION

It is a general object of the present invention to provide an improved and useful ball joint in which the above-mentioned objects are eliminated.

A more specific object of the present invention is to provide a ball joint generating play when wear of the ball sheet reaches a predetermined allowable amount so that the end of the service life of the ball joint can be recognized by a simple inspection.

Another object of the present invention is to provide a ball joint in which an appropriate amount of lubricant is supplied to portions between a spherical head of a ball stud and a ball sheet so that a smooth sliding motion of the spherical portion is maintained for a long time.

In order to achieve the above-mentioned objects, there is provided according to the present invention a ball joint comprising:

a ball stud having a spherical portion on one end thereof;

a first ball sheet and a second ball sheet having the spherical portion interposed therebetween, the first ball sheet being displaceable toward the second ball sheet when the second ball sheet has been worn due to sliding of the spherical portion; and displacement restricting means for restricting displacement of the first ball sheet toward the second ball sheet so that the first ball sheet is held at a predetermined position relative to the second ball sheet.

In the above-mentioned structure of the ball joint, when at least one of the first and second ball sheets has been worn, the first and second ball sheets are displaced toward each other so that the spherical portion of the ball stud is interposed between the first and second ball sheets with an appropriate pressure applied by the first and second ball sheets. According to the present invention, there is provided displacement restriction means for restricting the displacement of the first ball sheet relative to the second ball sheet. That is, when an amount of wear of the first and second sheet exceeds a predetermined level, the first ball joint cannot be moved beyond the predetermined position relative to the second ball sheet. Thus, when one of the first and second ball sheets has been excessively worn, there may be formed a gap between the spherical portion and the fist and second ball sheets. Accordingly, the fact that the wear of one of the first and second ball sheets has reached a maximum allowable amount can be determined by checking play generated in the ball joint.

In one embodiment of the present invention, the first ball sheet may engage with the second ball sheet so that a rotation of the first ball sheet relative to the second ball sheet is restricted.

Additionally, the first ball sheet may have a generally disk-like shape and the second ball sheet may have a generally cylindrical shape with one end having a reduced diameter. An outer surface of the first ball sheet may engage with an inner surface of the second ball sheet. Further, the first ball sheet may have a plurality of protrusions on the outer surface and the second ball sheet may have a plurality of recesses on the inner surface so that each of the protrusions enters a respective one of the recesses when the first ball sheet is assembled to the second ball sheet.

In one embodiment, the displacement restricting means comprises an end of each of the protrusions positioned a predetermined distance apart from an end of the respective one of the recesses when the first ball sheet is assembled to the second ball sheet. The end of each of the protrusions may be tapered toward the second ball sheet with a predetermined angle, and each of the recesses may be tapered in the same direction as that of the protrusions of the first ball sheet with the predetermined angle.

In one embodiment according to the present invention, the first ball sheet is pressed against the spherical portion by a spring, and a pressing force applied to the first ball sheet by the spring is maintained when the first ball sheet is at the predetermined position relative to the second ball sheet.

Additionally, in one embodiment according to the present invention, a lubricant chamber is defined by the first ball sheet, the second ball sheet and the spherical portion so as to retain a lubricant therein, and the second ball sheet has, on an inner surface thereof, at least one groove extending between the lubricant chamber and a lower end of the second ball sheet opposite to the first ball sheet along a longitudinal direction of the second ball sheet, and wherein the groove comprises lubricant restricting means for restricting flow of lubricant in the groove.

Since the lubricant restricting means restricts the flow of the lubricant such as grease flowing down from the lubricant chamber to the lower end of the second ball sheet through the groove, the lubricant entering into the groove flows at a very slow speed which is sufficient for lubricating the spherical portion of the ball stud. Thus, the lubricant provided in the lubricant chamber lasts longer than that provided in a ball joint provided with a ball sheet having a groove without flow restriction. This results in a long service life of the ball joint according to the present invention.

In one embodiment, the lubricant restricting means may comprise a gradual reduction in a width of the groove in a direction toward the lower end of the second ball sheet. The lubricant restricting means may comprise a gradual reduction in a depth of the groove in a direction toward the lower end of the second ball sheet.

Additionally, the lubricant restricting means is provided to the groove in a region of the lower end of the second ball sheet. The lubricant restricting means may comprise a dam protruding from a bottom surface of the groove. The dam mat have a predetermined height from the bottom surface of the groove or a predetermined width in a longitudinal direction of the second ball sheet so that the flow of the lubricant is restricted.

Further, the lubricant restricting means may comprise an orifice in which a width of the groove is reduced so that the flow of the lubricant is restricted.

Further, the ball joint according to the present invention may be provided with retaining means for retaining lubricant within the lubricant chamber. The retaining means may comprise an increase in an area of an inner surface of the lubricant chamber. The retaining means may comprise a plurality of fins protruding into the lubricant chamber from at least one of the first ball sheet and the second ball sheet.

Other objects, features and advantages of the present invention will become more apparent from the following detailed description when read in conjunction with the accompanying drawings.

DETAILED DESCRIPTION OF THE PREFERRED EMBODIMENTS

Figure 1:
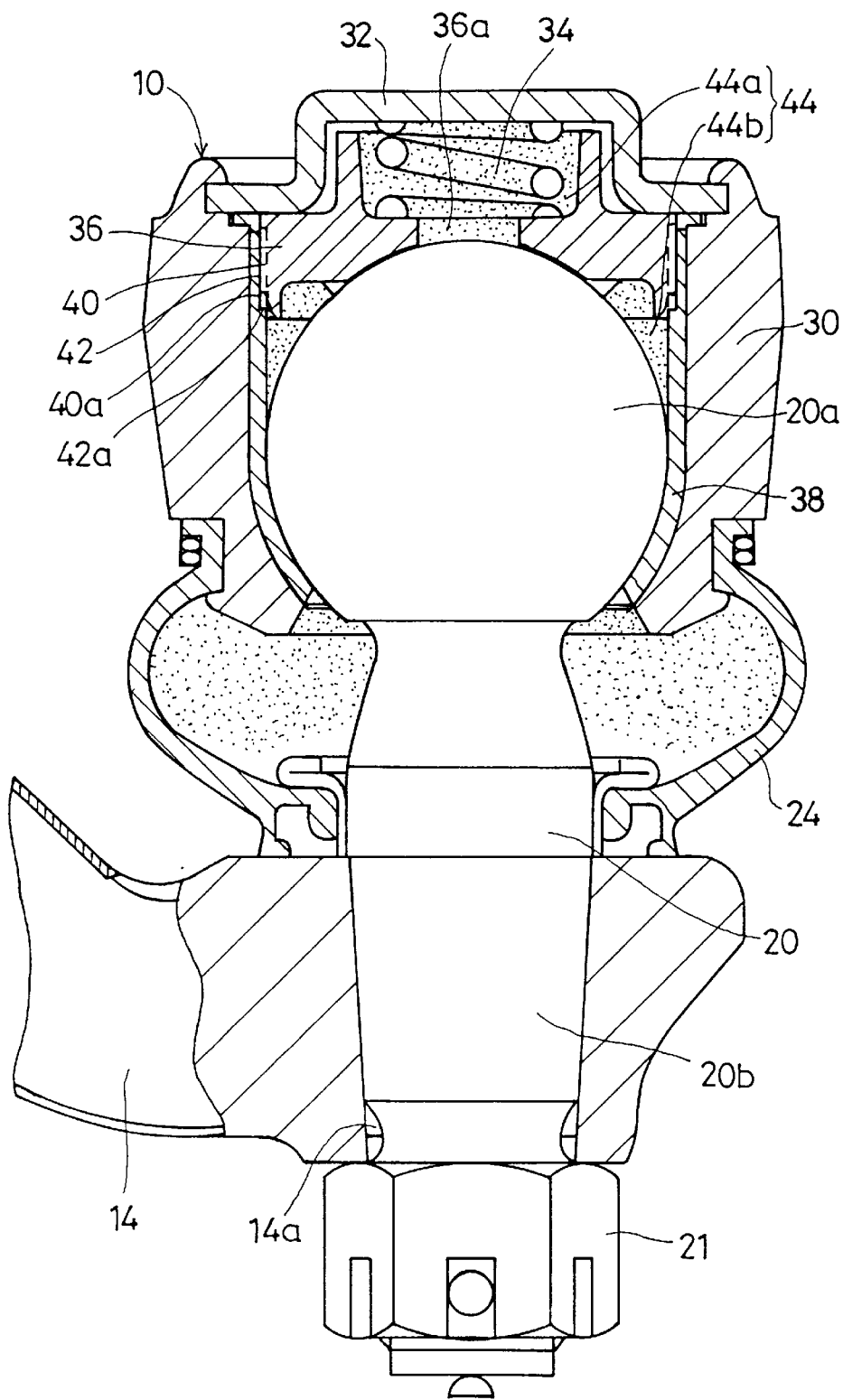
FIG. 1 is an enlarged cross-sectional view of a ball joint according to a first embodiment of the present invention.

A description will now be given of a first embodiment of the present invention. FIG. 1 is an enlarged cross-sectional view of a ball joint 10 according to the first embodiment of the present invention.

In FIG. 1, the ball joint 10 comprises a ball stud 20 which is mounted on a coupling member 14. The ball stud 20 is a rigid metal member, and comprises a spherical portion 20a and a shaft portion 20b. An end of the shaft portion 20b is threaded. The threaded portion of the shaft portion is inserted through a through hole 14a of the coupling member 14 so that the ball stud in securely fixed on the coupling member by screwing a nut 21 on the threaded portion of the shaft portion 20b.

The spherical portion 20a of the ball stud 20 is housed in a socket 30, and is interposed between a upper sheet 36 and a lower sheet 38. The lower sheet 38 is formed of plastic and has generally a cylindrical shape. The lower sheet 38 is situated inside the socket 30. A diameter of one end (lower end in the figure) of the lower sheet 38 is gradually reduced so that the contour of the inner surface of the lower sheet 38 follows the contour of the spherical portion 20a. The lower part of the inner surface of the socket 30 is formed to fit the reduced diameter portion.

The upper sheet 36 is formed of a plastic material, and has a large diameter portion and a small diameter portion having a diameter smaller than the diameter of the large diameter portion. A portion of a bottom surface of the large diameter portion is spherically formed so as to conform to the contour of the spherical portion 20a. A through opening 36a is formed in a center of the upper sheet 36. The diameter of the through opening 36a adjacent to the bottom surface is smaller than the diameter an upper portion of the through opening 36a.

A dust cover 24 is provided under the socket 30. The dust cover 24 is formed of an elastic material and has a substantially cylindrical shape, a middle portion of which is expanded. An upper rim of the dust cover 24 engages with the lower part of the socket 30, and a lower rim engages with a periphery of a mounting member which fits over a middle portion of the ball stud. The dust cover 24 seals the lower end of the socket 30 so that no dust enters into the socket from the lower end thereof. The dust cover 24 also functions to prevent leakage of a grease retained inside the dust cover 24. Since the dust cover 24 has elasticity, the dust cover 24 is deformed in response to a swivel motion of the ball stud 20. A cap 32 is mounted on a top of the socket 30 by means of caulking so as to seal an opening of the socket 30. A grease chamber 44 comprising a space 44a and a space 44b is formed within the socket 30. The space 44a is defined by the cap 32 and the through opening 36a of the upper sheet 36. The space 44b is defined by the spherical portion 20a, the upper sheet 36 and the lower sheet 38. A grease is retained in the grease chamber 44 so as to lubricate the spherical portion 20a of the ball stud 20, the upper sheet 36 and the lower sheet 38 so that friction between the spherical portion 20a and each of the upper and lower sheets 36 and 38 is reduced.

A back-up spring 34 is provided in the space 44a so as to urge the upper sheet 36 against the spherical portion 20a. Thus, the spherical portion 20a of the ball stud 20 is supported between the lower sheet 38 and the upper sheet 36 at a constant pressure applied by the upper sheet 36. According to the above-mentioned construction, the spherical portion 20a of the ball stud 20 is rotatable in any direction.

Figure 2:
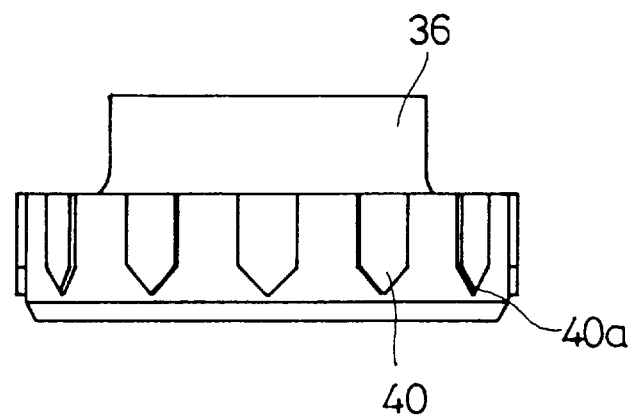
FIG. 2 is a side view of an upper sheet shown in FIG. 1.
Figure 3:
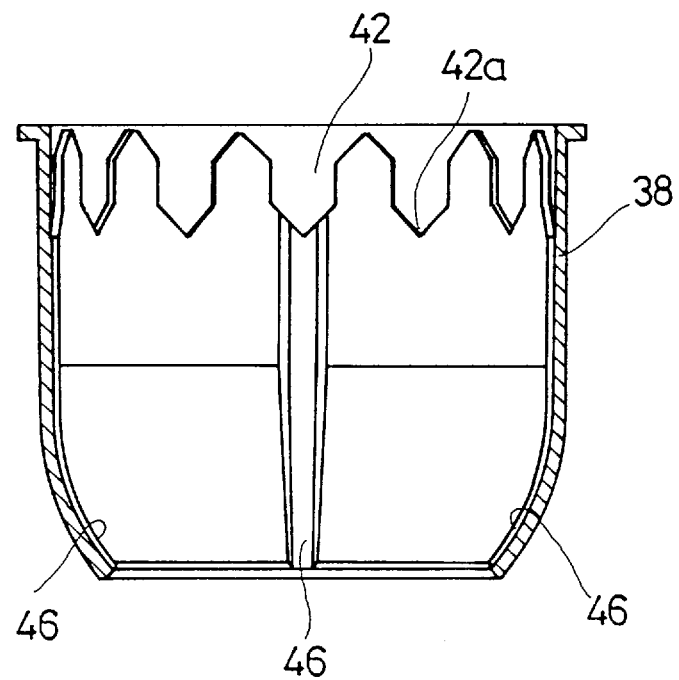
FIG. 3, is a cross-sectional view of a lower sheet shown in FIG. 1.

FIG. 2 is a side view of the upper sheet 36. FIG. 3 is a cross-sectional view of the lower sheet 38.

As shown in FIG. 3, four lubrication grooves 46 extending in a longitudinal direction of the lower sheet 38 are formed on an inner surface of the lower sheet 38 at equal intervals along a circumference. A grease retained in the grease chamber 44 is supplied to the entire surface of the spherical portion 20a via the lubrication grooves 46.

In the present embodiment, engaging parts 40 and 42 are provided on a lower end of the upper sheet 36 and an upper end of the lower sheet 38, respectively. A description will now be given, with reference to FIGS. 2–7, of the engaging parts 40 and 42.

As shown in FIG. 2, a plurality of engaging parts 40 are protrudingly formed along a circumferential surface of the large diameter portion of the upper sheet 36. As shown in FIG. 3, a plurality of the engaging parts 42 are correspondingly formed on the lower sheet 38. Each of the engaging parts 40 fits in a respective one of the engaging parts 42 when the upper sheet 36 is assembled to the lower sheet 38. Thus, when a tip 40a of each of the engaging parts 40 reaches an tip 42a of a respective one of the engaging parts 42, the upper end 36 is restricted from being moved further into the lower sheet 38.

Figure 4:
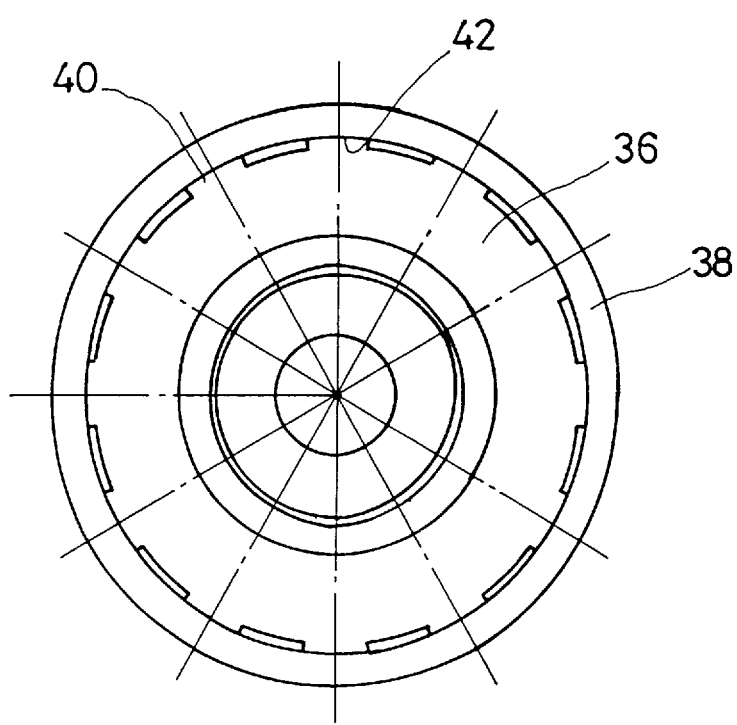
FIG. 4 is a plan view of the ball joint shown in FIG. 1 in a state where a cap is removed.

FIG. 4 is a plan view of the ball joint 10 in a state where the cap 32 is removed. As shown in FIG. 4, the upper sheet is assembled to the lower sheet in a state where each of the engaging parts 40 of the upper sheet 36 engages with a respective one of the engaging parts 42 of the lower sheet 38. The engaging parts 40 have a diameter slightly smaller than a diameter of the engaging parts 42 so that the upper sheet 36 is movable in a longitudinal direction of the lower sheet 38 while the engaging parts 40 engage with the engaging parts 42. Accordingly, the upper sheet 36 can be pressed against the spherical portion 20a by the back-up spring 34, resulting in an appropriate sliding motion of the spherical portion 20a of the ball stud 20.

Figure 5:
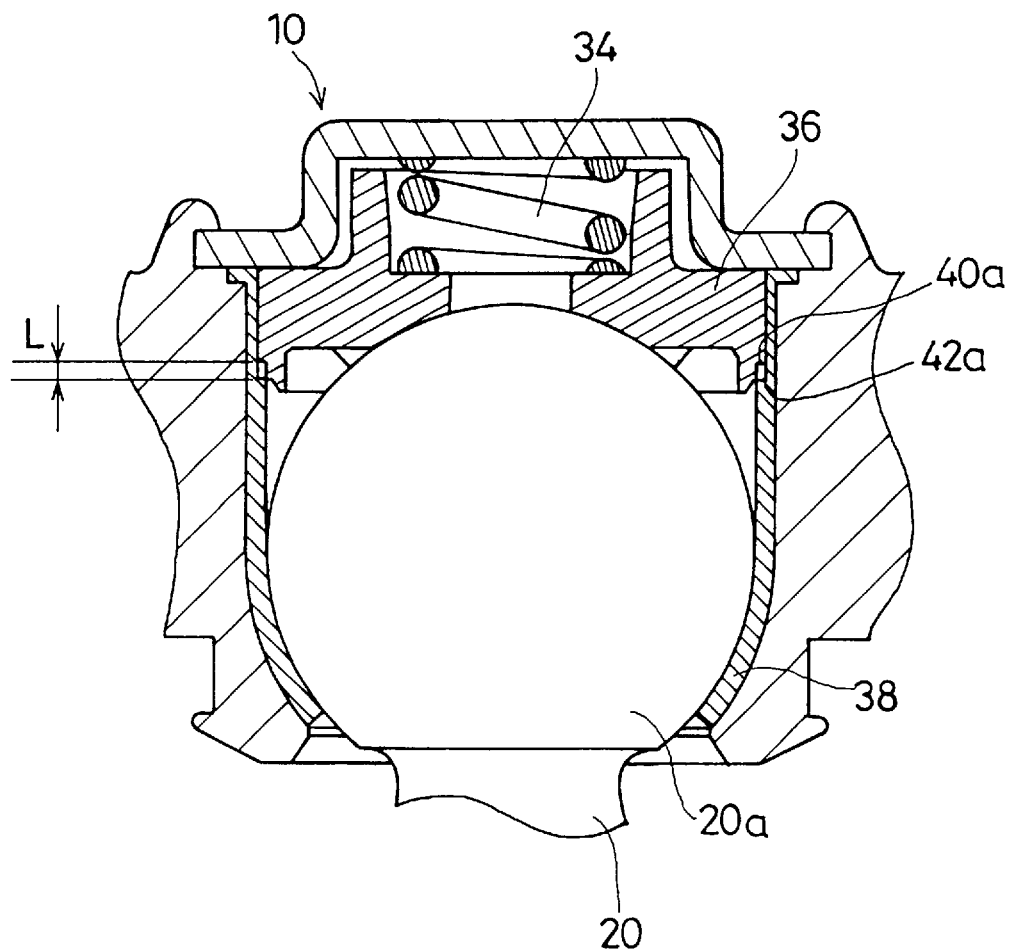
FIG. 5 is a cross-sectional view of a portion of the ball joint shown in FIG. 1 where each of an upper sheet and a lower sheet has no wear.

FIG. 5 is a cross-sectional view of a portion of the ball joint 10 where each of the upper sheet 36 and the lower sheet 38 has no wear. In FIG. 5, the tip 40a of each of the engaging parts 40 of the upper sheet 36 is positioned a predetermined distance L apart from the tip 42a of each of the engaging parts 42 of the lower sheet 38. Accordingly, a movement of the upper sheet 36 in a direction further inside the lower sheet 38 is not restricted, and thus the lower sheet is pressed against the spherical portion 20a by a spring force of the back-up spring 34. As a result, the spherical portion 20a is supported between the lower sheet 38 and the upper sheet 36 at an appropriate pressure. This condition provides a sliding motion of the spherical portion 20a without play.

Figure 6:
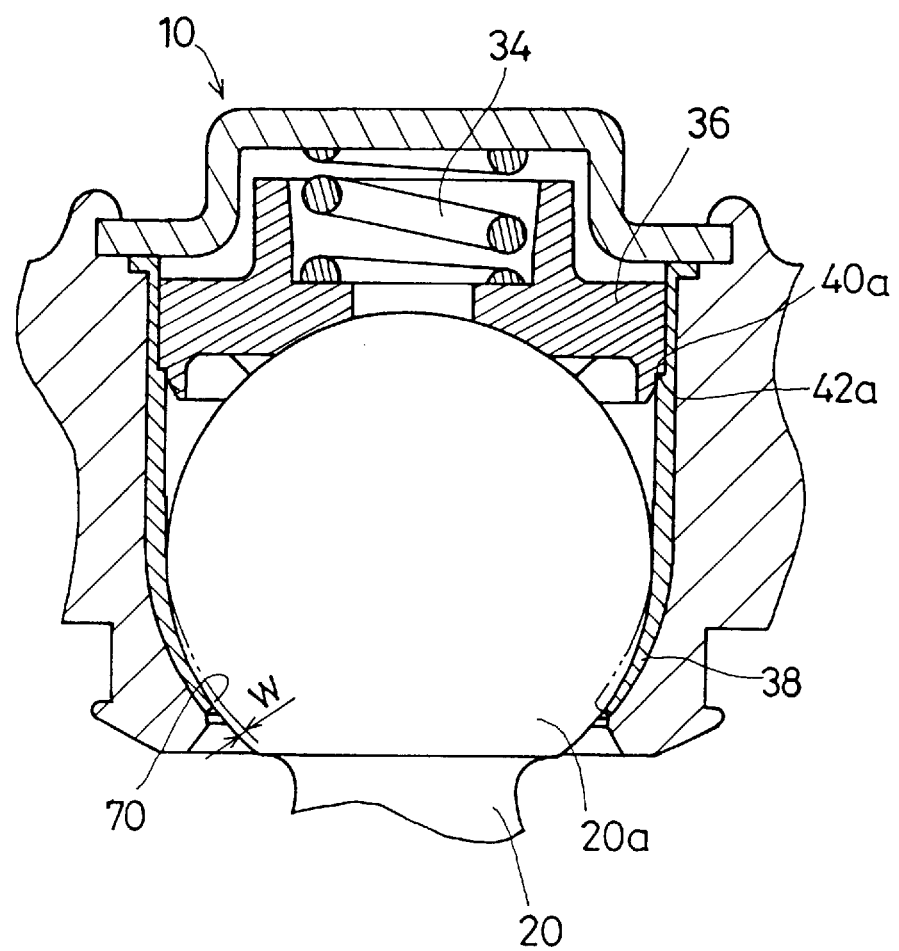
FIG. 6. is a cross-sectional view of a part of the ball joint shown in FIG. 1 where the lower sheet has been worn by movement of a spherical portion.

FIG. 6 is a cross-sectional view of a part of the ball joint 10 in a state where the lower sheet 38 has been worn by movement of the spherical portion 20a. In FIG. 6, a worn portion of the lower sheet 38 is indicated by a reference numeral 70. Due to the wearing of the lower sheet 38, the spherical portion 20a has moved further inside the lower sheet 38. This results in the upper sheet 36 moving further inside the lower sheet 38 from a position shown in FIG. 6. When an amount of wear reaches W as indicated in FIG. 6, the tip 40a of each of the engaging parts 40 of the upper part 36 contacts the tip 42a of each of the engaging parts 42 of the lower sheet 38. That is, the distance between the tip 40a and the tip 42a becomes zero.

If the amount of wear of the lower sheet 38 is zero to W, that is, if the ball joint is in a state between that shown in FIG. 5 and that shown in FIG. 6, the upper sheet 36 can be moved further inside the lower sheet 38. Thus, an appropriate pressure applied to the spherical portion 20a via the upper sheet 36 is maintained, resulting in a normal operation of the ball joint 10.

Figure 7:
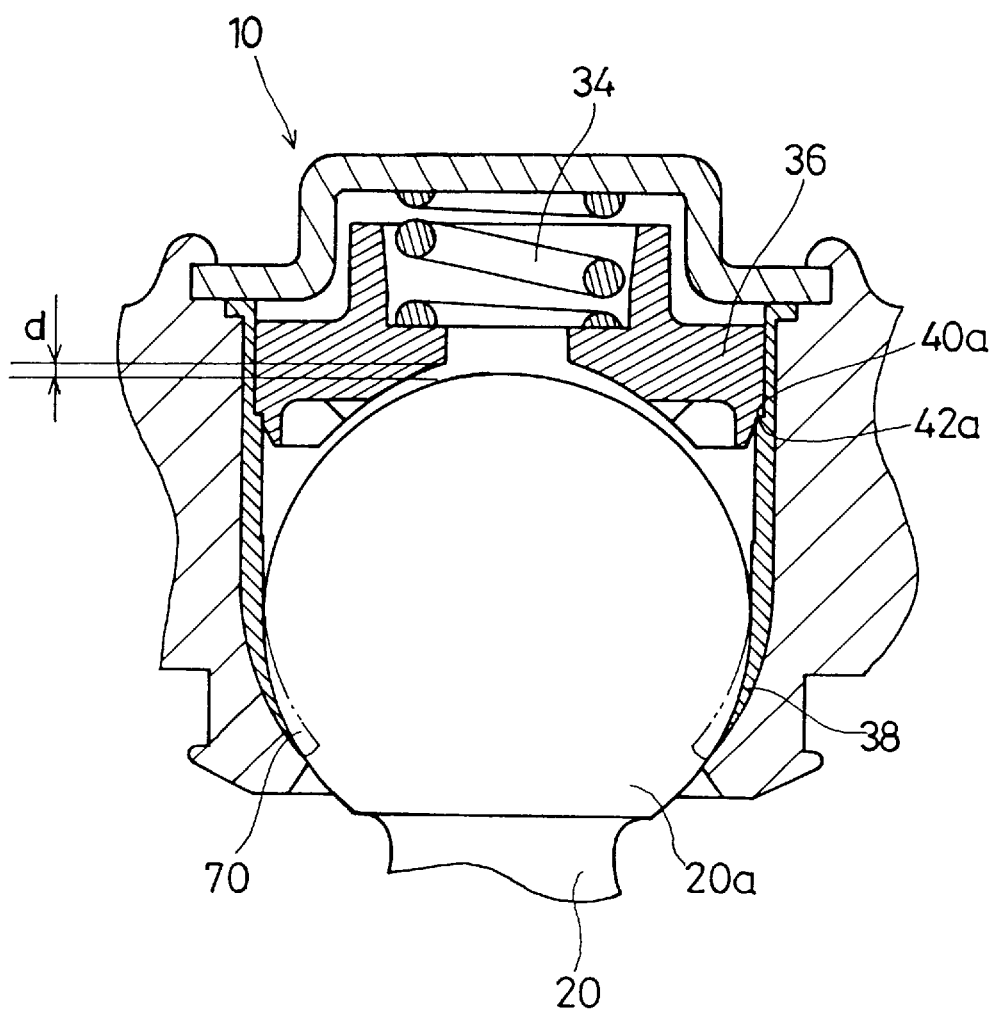
FIG. 7 is a cross-sectional view of a part of the ball joint shown in FIG. 1 in a state where the lower sheet has been excessively worn.

FIG. 7 is a cross-sectional view of a part of the ball joint 10 in a state where the lower sheet 38 has been excessively worn. In FIG. 7, an amount of wear of the lower sheet 38 exceeds the amount W. Thus, the spherical portion 20a of the ball stud 20 is positioned further downwardly than that shown in FIG. 6, whereas the upper sheet 36 is maintained at the position indicated in FIG. 6 since the tip 40a of each of the engaging parts 40 of the upper sheet 36 contacts the tip 42a of each of the engaging parts 42 of the lower sheet 38. As a result, a gap d is formed between the spherical portion 20a of the ball stud 20 and the upper sheet 36. In this state, no pressure is applied to the spherical portion 20a via the upper sheet 36. Thus, play is created in the ball joint 10.

As discussed above, in the ball joint according to the first embodiment of the present invention, an appropriate pressure is applied to the spherical portion 20a via the lower sheet 36 until the wearing of the lower sheet 38 reaches the amount W. This means that no play is created in the ball joint 10 and the ball joint is operated in a normal condition until the wearing of the lower sheet 38 reaches the amount W. However, if an amount of wear exceeds W, play is created in the ball joint 10. Accordingly, it can be detected that the wearing of the lower sheet 38 exceeds the amount W by checking whether or not the ball joint 10 has play.

In this embodiment the amount W is set to an allowable limit of wearing of the lower sheet 38. The amount W can be set to an arbitrary value by varying the distance L between the tip 40a and the tip 42a when the lower sheet is assembled. Apparently, if the distance L is set to correspond to the maximum allowable amount of the wearing of the lower sheet 38, the ball joint 10 can be operated in a normal condition until the wearing of the lower sheet 38 reaches the maximum allowable amount.

It should be noted that if a length (free length) of the back-up spring 34 when no load is applied thereto is not sufficient, the back-up spring 34 may reach the free length before the upper sheet 36 reaches the position beyond which the lower sheet 36 cannot move. In this case, the pressing force exerted to the upper sheet becomes zero, and thus the back-up spring 34 and the lower sheet 36 may become freely movable in the longitudinal direction of the ball joint 10. In this condition, the back-up spring 34 and the lower sheet may vibrate in the ball joint 10, causing generation of noise or malfunction of the ball joint 10. However, in order to eliminate this problem, the back-up spring 34 of the present invention has a free length sufficiently longer than a longitudinal dimension of the space 44a when the wearing of the lower sheet 38 reaches the maximum allowable amount W. Thus, there remains a pressing force of the back-up spring 34 even when the maximum allowable amount W is reached, eliminating the above-mentioned problem caused by the vibration of the back-up spring 34 or the upper sheet 36.

In the present embodiment, the engaging parts 42 of the upper sheet 36 engage with the respective engaging parts 40 of the lower sheet. This construction prevents the upper sheet 36 and the lower sheet 38 from rotating relative to each other. Thus, rotation of the back-up spring 34 is also prevented, eliminating generation of noise and wear due to the back-up spring 34 sliding relative to the cap 32. Accordingly, the present embodiment has an advantage that a quiet operation of the ball spring 10 is achieved.

Additionally, as shown in FIGS. 2 and 3, each of the engaging parts 40 of the upper sheet 36 has a shape in which a width in the vicinity of the extreme end gradually decreasing toward the tip 40. Due to this configuration of the engaging parts 40, an angular position of the lower sheet 36 is automatically adjusted, when the upper sheet 36 is assembled to the lower sheet 38, so that each of the engaging parts 40 of the upper sheet 36 completely fits in the respective one of the engaging parts 42 of the lower sheet 38. Thus, the assembling operation of the upper sheet 36 to the lower sheet 38 is easy.

Figure 8:
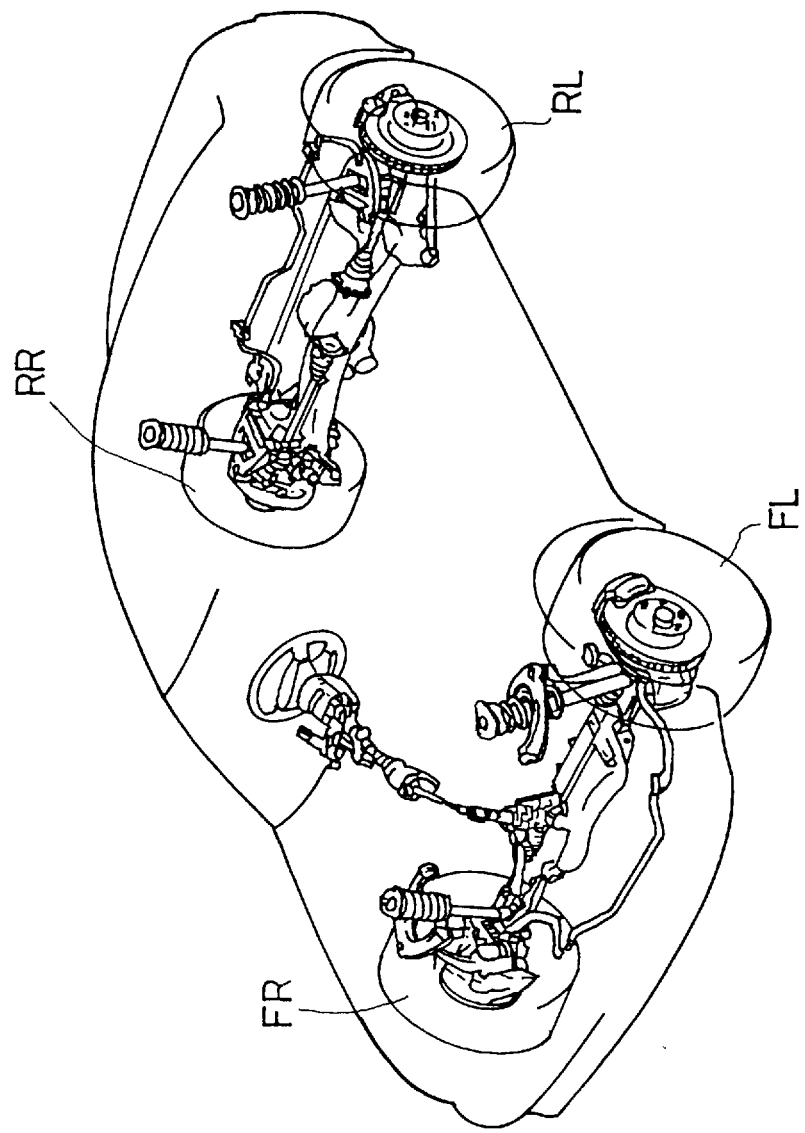
FIG. 8 is an illustration of a vehicle having suspension mechanisms using the ball joint shown in FIG. 1.
Figure 9:
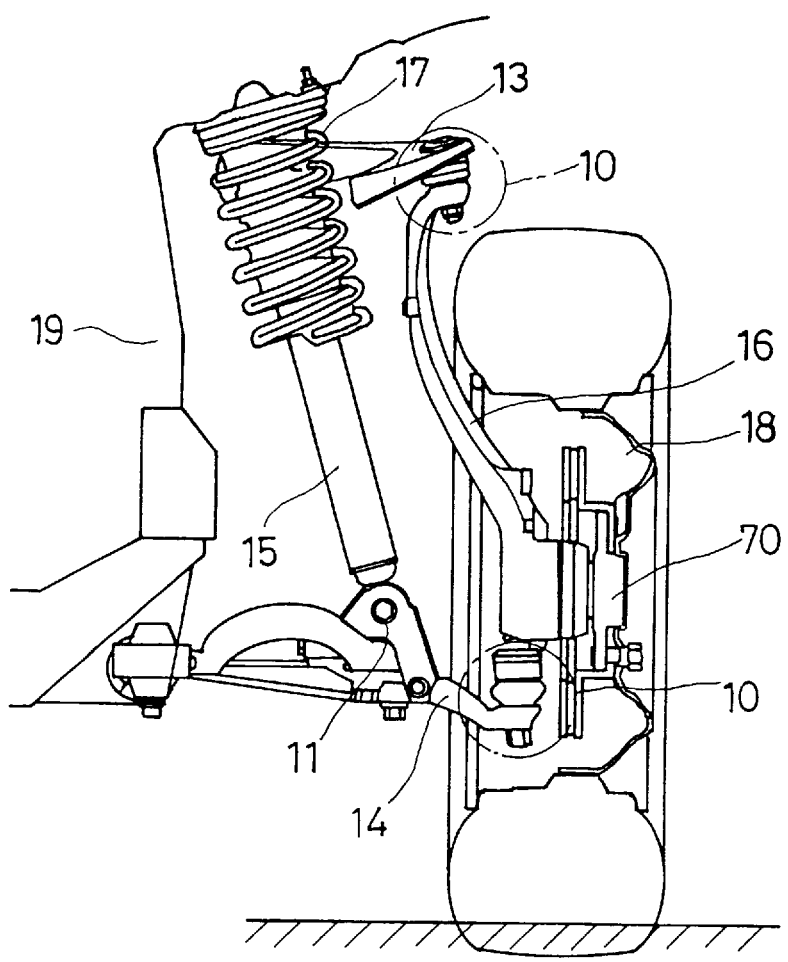
FIG. 9 is a side view of one of the suspension mechanisms shown in FIG. 8.

A description will now be given, with reference to FIGS. 8 and 9, of an example in which the ball bearing 10 is applied to a suspension mechanism of a vehicle. FIG. 8 is an illustration of the vehicle having suspension mechanisms using the ball joint 10 according to the present embodiment. FIG. 9 is a side view of one of the suspension mechanisms shown in FIG. 8.

As shown in FIG. 8, wheels FL, FR, RL and RR are supported by respective suspension mechanisms. Hereinafter, a description will be given of a structure of the suspension mechanism provided for the front right wheel FR, for example. FIG. 9 shows the suspension mechanism for the front right wheel FR. The suspension mechanism shown in FIG. 9 comprises a pair of ball joints 10, upper arm 13, shock absorber 15, a knuckle 16, a coil spring 17, a wheel 18 and a lower arm 14.

One end of the lower arm 14 is fixed to a vehicle body 19, and the other end is connected to the knuckle 16 via one of the ball joints 10. The knuckle 16 is a member which is connected to the wheel 18 via a bearing 70. An upper end of the knuckle 16 is connected to the upper arm 13 via another one of the ball joints 10. The other end of the upper arm 13 is mounted to the vehicle body 19 via a bushing (not shown in the figure). An upper end of the coil spring 17 and an upper end of the shock absorber 15 provided inside the coil spring 17 are fixed to the vehicle body 19. A lower end of the shock absorber 15 is connected to the lower arm 14 via a joint 11 so that the shock absorber 15 and the lower arm 14 are pivotable to each other.

In the above-mentioned construction, if the wheel 18 moves up and down, the coil spring 17 and the shock absorber 15 are compressed and extended with a swivel motion of the pair of ball joints 10. Thus, the up and down movement of the wheel 18 is prevented from being transmitted to the vehicle body 19. Since the knuckle 16 is supported by the upper are 13 via one of the ball joints 10 on the upper end, and supported by the lower arm 14 via another one of the ball joints 10 on the lower end, the suspension mechanism is operable during a steering operation.

In a case where a ball joint is used in a suspension mechanism of a vehicle, the ball joint must be replaced with a new ball joint when a ball sheet in the ball joint has been worn out. In the ball sheet of the type having a back-up spring which presses the ball sheet even after the ball sheet has been excessively worn, play is not generated in the ball joint even where the ball joint cannot be normally operated. Thus, it is not possible to determine a magnitude of the wear of the ball sheet by detecting play in the ball joint. Additionally, since the ball sheet is housed in the body of the ball joint, it is not possible to visually inspect the ball sheet from outside. Accordingly, there is a possibility for a ball joint of this type that the ball joint is used in a state where the ball sheet has been worn beyond an allowable limit. That is, in the case where the ball joint has a lower sheet such as the lower sheet 38 of the ball joint 10 according to the present embodiment, the ball joint may be continuously used in a state where the lower sheet has been excessively worn.

On the other hand, if pressure generated by the back-up spring is not applied to the ball sheet, the wear of the ball sheet appears as play in the ball joint. Thus, it is easy to detect the wearing of the ball sheet in a ball joint of this type. However, as previously discussed, the ball joint of this type may have a short service life due to an early generation of play in the ball joint.

On the other hand, in the ball joint 10 according to the present embodiment, it is easy to determine whether or not the wear of the lower sheet 38 has reached the maximum allowable amount by detecting play in the ball joint 10. Accordingly, when the ball joint 10 is used, generation of noise and a change in feeling of a steering operation due to the deterioration in performance of the ball joint 10 can be prevented.

Figure 10:
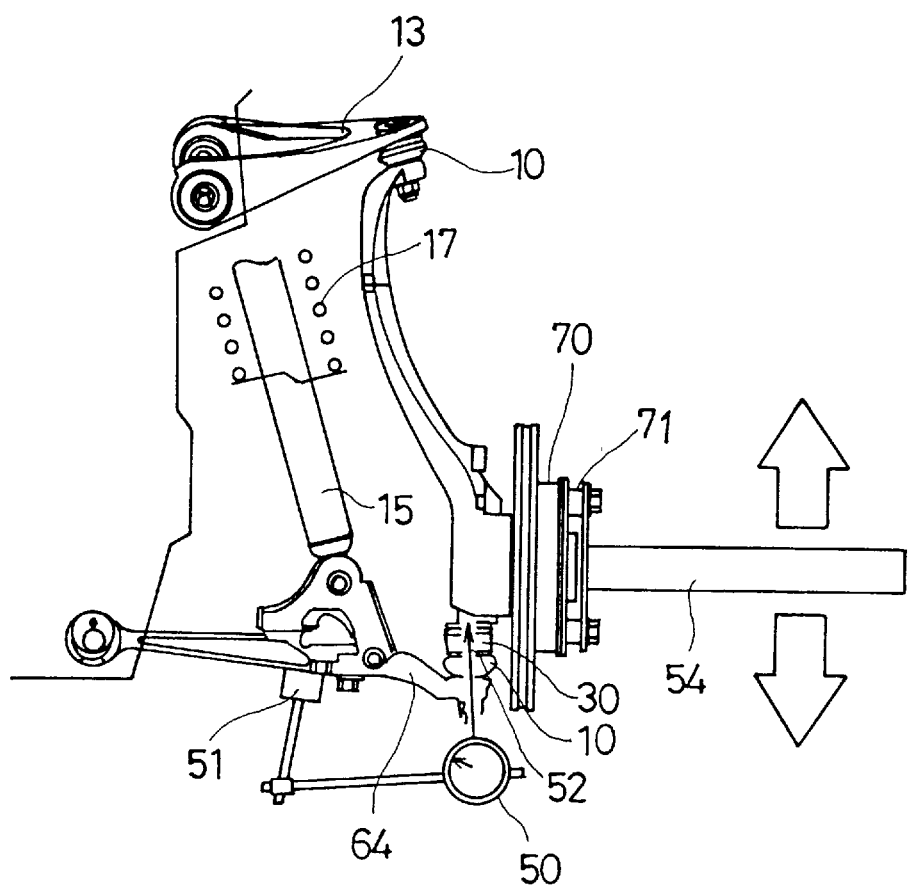
FIG. 10 is an illustration for explaining a detecting operation of play in the ball joint in the suspension mechanism shown in FIG. 9.

A description will now be given, with reference to FIG. 10, of a method for detecting play in the ball joint 10. FIG. 10 is an illustration for explaining a detecting operation of play in the ball joint 10 in the suspension mechanism shown in FIG. 9. It should be noted that FIG. 10 shows a state where the wheel 18 and tire are removed. The play generated in the suspension mechanism can be easily detected by applying a force to a tire in up and down (vertical) directions while the vehicle is jacked up. That is, if the tire is moved up and down by a relatively small force, this indicates that play is generated in the ball joints 10.

Additionally, as shown in FIG. 10, an amount of wear of the lower sheet 38 can be measured by a dial gauge 50. In FIG. 10, a base 51 of the dial gauge 50 is attached to the lower arm 14. A stylus 52 of the dial gauge 50 contacts the socket 30 of the ball joint 10 from a bottom side. Additionally, a jig 54 is attached to an axle hub 71, which is integral with the knuckle 16 via the bearing 70. In this state, a predetermined force is applied to the jig 54 in up and down directions, and the dial gauge 50 is read. Thus, displacement of the axle hub 70 relative to the lower arm 14 is measured as a difference between the readings of the dial gauge 50. The displacement of the axle hub 71 corresponds to the play generated in the ball joint 10. Thus, an amount of wear of the lower sheet 38 can be determined by the displacement of the axle hub 71 with a high level of accuracy.

As discussed above, the play generated in the ball joint 10 according to the present embodiment can be easily and positively detected. Accordingly, it is easy to determine a need for replacement of the ball joint during operational life of the vehicle, thereby providing good maintenance of the vehicle.

Figure 11:
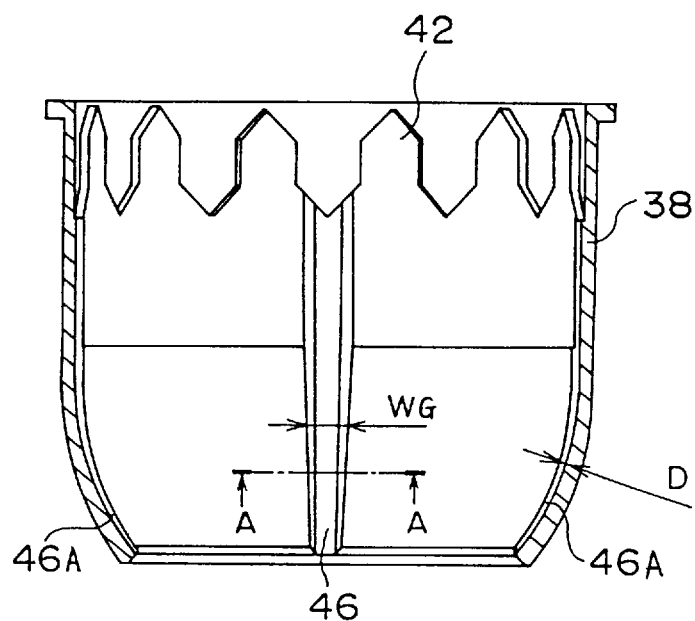
FIG. 11 is a cross sectional view of the lower sheet of a ball joint according to a second embodiment of the present invention.
Figure 12:
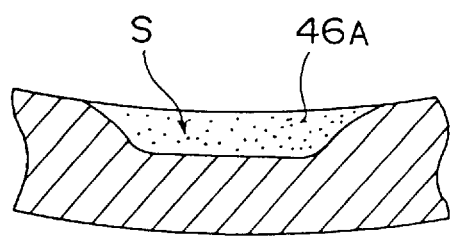
FIG. 12 is a cross-sectional view taken along a line A—A of FIG. 11.

A description will now be given, with reference to FIGS. 11 and 12, of a second embodiment of the present invention. FIG. 11 is a cross-sectional view of the lower sheet 38 of a ball joint according to the second embodiment of the present invention. FIG. 12 is a cross-sectional view taken along a line A—A of FIG. 11. In FIG. 11, parts that are the same as the parts shown in FIGS. 1 and 3 are given the same reference numerals, and descriptions thereof will be omitted. The ball joint according to the second embodiment has the same structure as that of the ball joint 10 according to the first embodiment except for configuration of each of the lubrication grooves 46A provided in the lower sheet 38.

In FIG. 11, a width WG of each of the lubrication grooves 46A is reduced toward the lower end of the lower sheet 38. Additionally, a depth D of each of the lubrication grooves 46A is reduced toward the lower end of the lower sheet 38. Accordingly, a cross-sectional area S of each of the lubrication grooves 46A is reduced toward the lower end of the lower sheet 38.

As discussed above in the description of the first embodiment, the grease chamber 44 is formed in the upper portion of inside the lower sheet 38. Thus, a grease provided in the grease chamber 44 is supplied to a surface of the spherical portion 20a via the lubrication grooves 46A. That is, the grease in the grease chamber 44 flows through the lubrication groves 46A to lubricate the spherical portion 20a. The grease finally exits the lubrication grooves 46A and is collected in a chamber formed by the dust cover 24.

In the second embodiment, since the cross-sectional area S of each of the lubrication grooves 46A is reduced toward the end of the lower sheet 38, an amount of grease flowing down through the lubrication grooves 46A is adjusted to an appropriate amount. That is, a sufficient amount of grease is supplied to the lubrication grooves 46A while an amount of grease exiting the lubrication grooves 46A is reduced. Thus, the grease provided in the grease chamber 44, when the ball joint is assembled, lasts longer than that of the ball joint having a lower sheet provided with straight grooves. This results in a long lasting lubrication, and thus provides a long service life of the ball joint.

Additionally, since the width WG of each of the lubrication grooves 46A is reduced toward the lower end of the lower sheet 38, a contact area between the spherical portion 20a and the lower sheet 38 is increased as compared to that of the ball joint having a lower sheet provided with straight grooves each having a uniform width. Thus, in the present embodiment, pressure applied to the lower sheet 38 by the spherical portion 20a is reduced, resulting in an improvement in slidability of the spherical portion 20a.

In the double wishbone type suspension such as shown in FIG. 9, a compression force of the coil spring 17 is applied to the lower arm 14. The compression force acts as an extension load to the ball stud 20 of the ball joint 10. That is, the ball stud 20 is pulled downwardly in FIG. 1 when the coil spring 11 is compressed. In this condition, the spherical portion 20b is pressed downwardly against the lower sheet 38. The pressure applied to the lower sheet 38 is a maximum in the vicinity of the lower end of the lower sheet 38. In this embodiment, the contact area which corresponds to a pressure receiving area is increased since the width WG of each of the lubrication grooves 46A is reduced. Thus, the pressure applied to the lower sheet 38 is reduced in the area where the pressure becomes maximum, resulting in an improved slidability and a longer service life.

Figure 13:
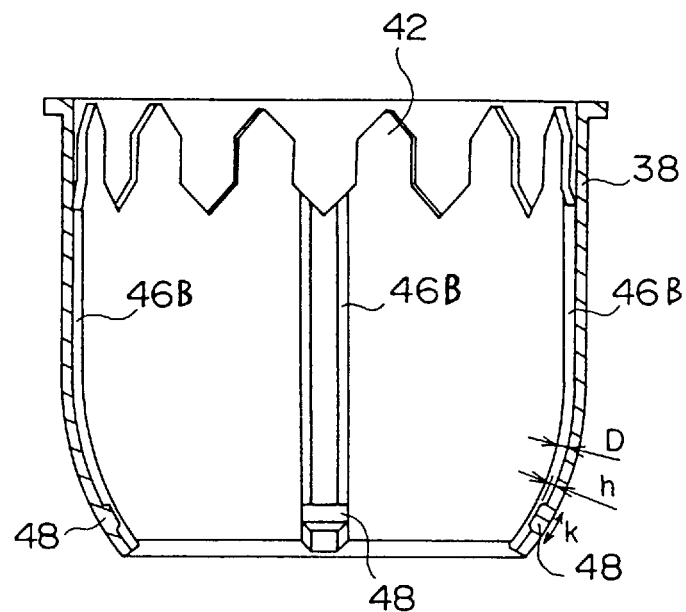
FIG. 13 is a cross-sectional view of the lower sheet of a ball-joint according to a third embodiment of the present invention.

A description will now be given, with reference to FIG. 13, of a third embodiment according to the present invention. FIG. 13 is a cross-sectional view of the lower sheet 38 of a ball joint according to the third embodiment of the present invention. In FIG. 13, parts that are the same as the parts shown in FIGS. 1 and 3 are given the same reference numerals, and descriptions thereof will be omitted. The ball joint according to the third embodiment has the same structure as that of the ball joint 10 according to the first embodiment except for a configuration of each of the lubrication grooves 46B provided in the lower sheet 38.

As shown in FIG. 13, each of the lubrication grooves 46B has a dam 48 in the vicinity of the lower end. The dam 48 is formed by protruding a bottom surface of each of the lubrication grooves 46B. The dam 48 has a height h from a bottom surface of each of the lubrication grooves 46B, and has a width k in a longitudinal direction of each of the lubrication grooves 64B. The dam 48 functions to restrict flow of the grease in the lubrication grooves 46B. Apparently, the present embodiment has the same effect with respect to the restriction of the flow of grease as that of the second embodiment. Additionally, the restriction of the flow of the grease can be increased as the height h is increased or the width k is increased. That is, an amount of grease exiting from the lubrication grooves 46B is decreased as the height h or the width k is increased. Thus, an appropriate restriction of the flow of grease can be easily obtained by adjusting the height h or the width k of the dam 48.

Figure 14:
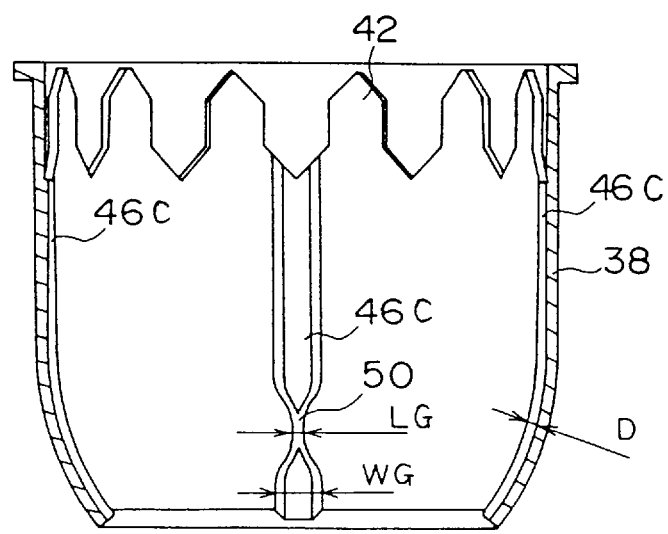
FIG. 14, is a cross-sectional view of the lower sheet of a ball joint according to a fourth embodiment of the present invention.

A description will now be given, with reference to FIG. 14, of a fourth embodiment according to the present invention. FIG. 14 is a cross-sectional view of the lower sheet 38 of a ball joint according to the fourth embodiment of the present invention. In FIG. 14, parts that are the same as the parts shown in FIGS. 1 and 3 are given the same reference numerals, and descriptions thereof will be omitted. The ball joint according to the fourth embodiment has the same structure as that of the ball joint 10 according to the first embodiment except for a configuration of each of the lubrication grooves 46C provided in the lower sheet 38.

As shown in FIG. 14, each of the lubrication grooves 46C has an orifice 50 in which the width WG of each of the lubrication grooves 46C is reduced to a width LG which is less than the width WG. The orifice 50 functions the same as the dam 48 in the third embodiment. That is, the flow of grease is restricted in the orifice 50. The amount of grease flowing in the lubrication grooves 46C can be easily adjusted by varying the width LG. Apparently, the orifice 50 of the preset embodiment has the same effect as that of the dam 48 of the third embodiment.

In the above-mentioned second to fourth embodiments, grease may be retained in the lubrication grooves 46A, 46B or 46C for a long time period since the flow of grease is restricted. Thus, the lubrication grooves 46A, 46B and 46C also function as grease chambers from which grease is directly supplied to a wide area of the surface of the spherical portion 20a when the ball stud 20 is swiveled or rotated. This further improves the lubrication of the ball joint according to the second to fourth embodiments.

Figure 15:
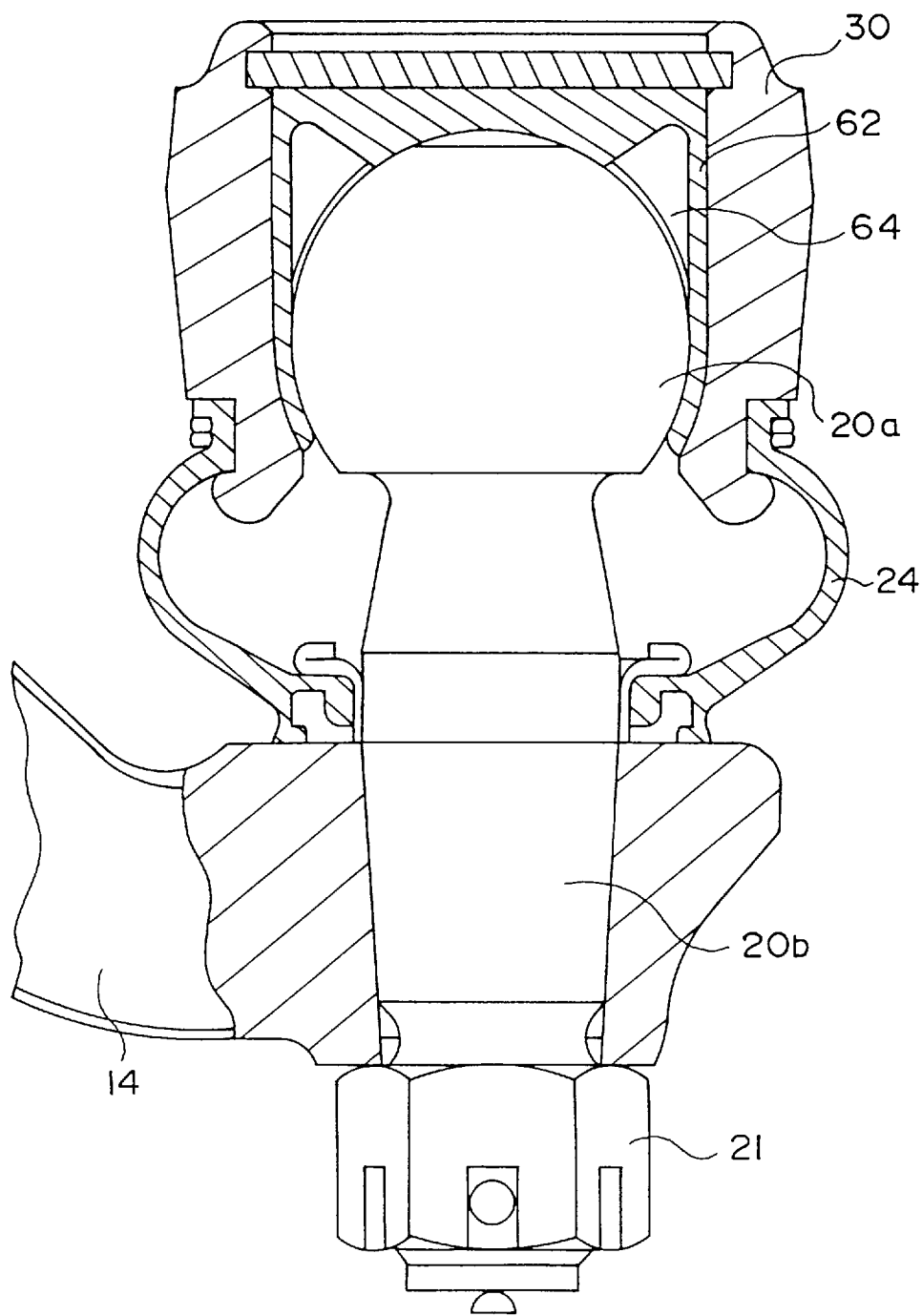
FIG. 15 is a cross-sectional view of a ball joint according to a fifth embodiment of the present invention.
Figure 16:
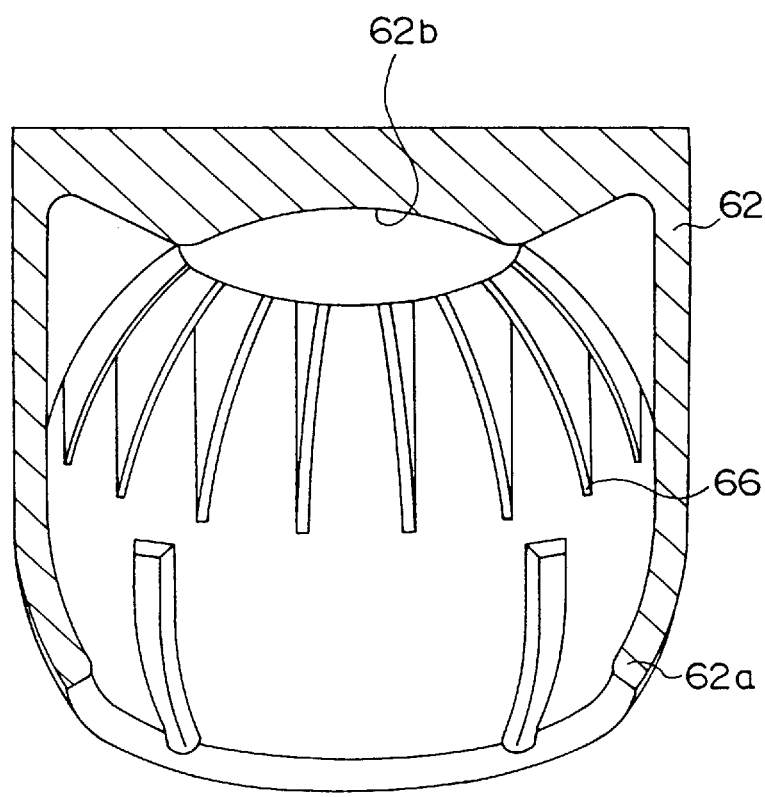
FIG. 16 is a cross-sectional view of a one-piece ball sheet shown in FIG. 15.

A description will now be given, with reference to FIGS. 15 and 16, of a fifth embodiment of the present invention. FIG. 15 is a cross-sectional view of a ball joint according to the fifth embodiment of the present invention. FIG. 16 is a cross-sectional view of a one-piece ball sheet shown in FIG. 15. In FIG. 15, parts that are the same as the parts shown in FIG. 1 are given the same reference numerals, and descriptions thereof will be omitted.

As shown in FIG. 15, in the present embodiment, a one-piece ball sheet 62 is provided in the socket instead of the upper sheet 36 and the lower sheet 38. The one-piece ball sheet 62 has a grease chamber 64 in an upper portion therein. The grease chamber 64 is provided with a plurality of fins 66 as shown in FIG. 16. The fins are arranged circumferentially at equally divided angles. An edge of each of the fins 66 is formed to follow a contour of the spherical portion 20a with a predetermined small clearance.

The fins 66 function to hold grease inside the grease chamber 64 by an increased contact area. That is, the grease provided in the grease chamber 64 is held around the fins 66 for a long time period because the grease which has a high viscosity adheres on surfaces of the fins 66. This restricts a flow of grease provided to a surface of the spherical portion 20a, resulting in an appropriate supply of the grease in the grease chamber to the spherical portion 20a. Thus, the grease in the grease chamber 64 lasts longer that grease provided in a grease chamber having no fins. The amount of grease held by the fins 66 is increased as the number of fins 66 is increased. Thus, the lubrication can be adjusted by changing the number of fins 66, resulting in a long service life of the ball joint. Additionally, in this embodiment, the fins 66 are integrally formed with the one-piece ball sheet 62. Thus, the one-piece ball sheet 62 and the fins 66 are easily formed by a method such as an injection molding.

Figure 17:
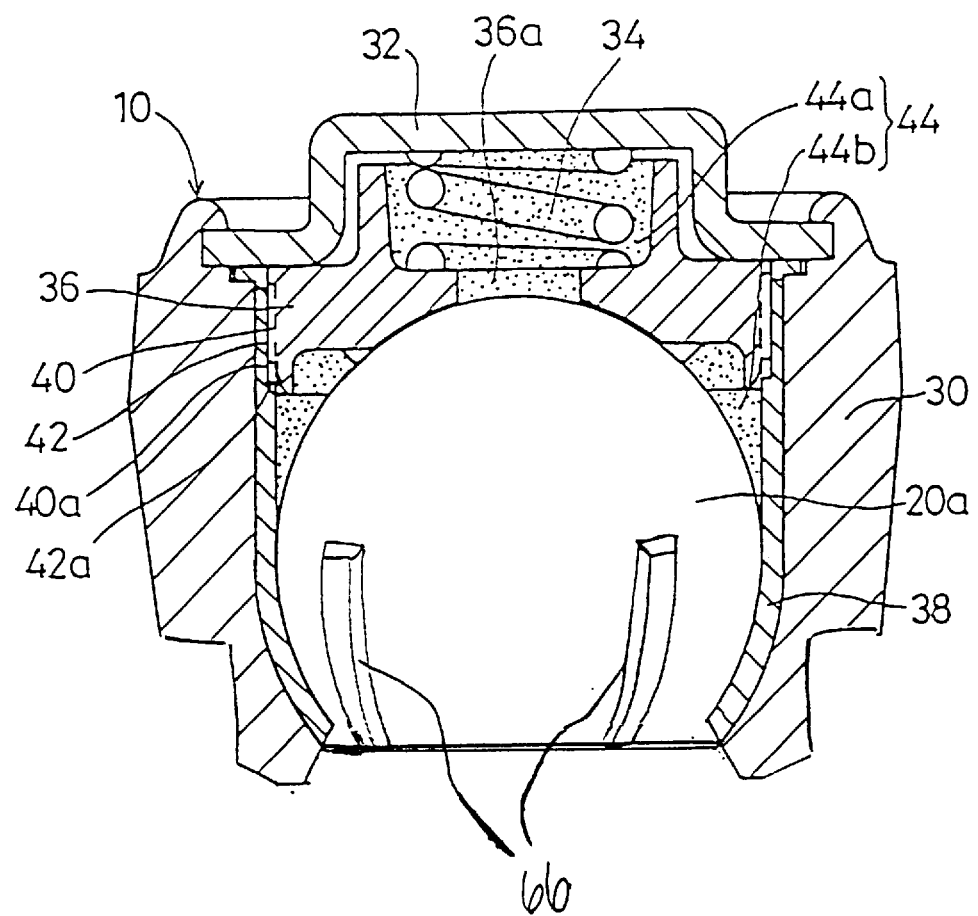
FIG. 17 is a cross-sectional view of a two-piece ball sheet as shown in FIG. 1.

It should be noted that although the fins 66 are formed in the one-piece ball sheet 62, it is appreciated that these kinds of fins can be formed in the lower sheet 38 provided in the ball joint according to the first to fourth embodiments, as shown in FIG. 17.

The present invention is not limited to the specifically disclosed embodiments, and variations and modifications may be made without departing form the scope of the present invention.

What is claimed is:

1. A ball joint comprising:
  a ball stud having a spherical portion on one end thereof, wherein the spherical portion defines an equator dividing the spherical portion into upper and lower halves at a maximum diameter of the spherical portion:
  a first ball sheet and a second ball sheet having said spherical portion interposed therebetween said first ball sheet being displaceable toward said second ball sheet when said second ball sheet has been worn due to sliding of said spherical portion, wherein said first ball sheet extends along the upper half of the spherical portion and does not cross the equator; and
  displacement restricting means for restricting displacement of said first ball sheet toward said second ball sheet so that said first ball sheet is held at a predetermined position relative to said second ball sheet,
    wherein a lubricant chamber is defined by said first ball sheet, said second ball sheet and said spherical portion so as to retain a lubricant therein, and wherein said second ball sheet extends from an upper end adjacent to said first ball sheet to a lower end spaced from said first ball sheet and wherein said second ball sheet has, on an inner surface thereof, at least one groove extending between said lubricant chamber and the lower end of said second ball sheet, and wherein said groove comprises lubricant restricting means for restricting flow of lubricant in said groove.

2. The ball joint as claimed in claim 1, wherein said lubricant restricting means comprises a gradual reduction in a width of said groove in a direction toward said lower end of said second ball sheet.

3. The ball joint as claimed in claim 1, wherein said lubricant restricting means comprises a gradual reduction in a depth of said groove in a direction toward said lower end of said second ball sheet.

4. The ball joint as claimed in claim 1, wherein said lubricant restricting means is provided to said groove in a region of said lower end of said second ball sheet.

5. The ball joint as claimed in claim 4, wherein said lubricant restricting means comprises a protrusion extending from a bottom surface of said groove to thereby reduce a cross-sectional area of the groove at the protrusion.

6. The ball joint as claimed in claim 5, wherein said protrusion has a predetermined height from said bottom surface of said groove so that the flow of said lubricant is restricted.

7. The ball joint as claimed in claim 5, wherein said protrusion has a predetermined width in a longitudinal direction of said groove.

8. The ball joint as claimed in claim 1, wherein said lubricant restricting means comprises an orifice in which a width of said groove is reduced so that the flow of said lubricant is restricted.

9. The ball joint as claimed in claim 1, wherein retaining means for retaining lubricant within said lubricant chamber is provided in said lubricant chamber.

10. The ball joint as claimed in claim 9, wherein said retaining means comprises an increase in an area of an inner surface of said lubricant chamber.

11. The ball joint as claimed in claim 10, wherein said retaining means comprises a plurality of fins protruding into said lubricant chamber from at least one of said first ball sheet and said second ball sheet.

* * * * *

UNITED STATES PATENT AND TRADEMARK OFFICE
CERTIFICATE OF CORRECTION

PATENT NO. : 5,772,352
DATED : June 30, 1998
INVENTOR(S) : Yasutaku FUKUMOTO, et al.

It is certified that error appears in the above-indentified patent and that said Letters Patent is hereby corrected as shown below:

Column 1, line 34, change "pressures" to --pressure--.

Column 3, line 34, change "mat" to --may--.

Column 4, line 43, change "in" to --is--.

Column 4, line 64, after "diameter" insert --of--.

Column 5, line 53, change "an" to --a--.

Column 7, line 5, change "36" to --38--.

Column 7, line 7, change "36" to --38--.

Column 7, line 9, after "sheet" insert --38--.

Column 7, line 32, change "decreasing" to --decreases--.

Column 8, line 9, change "are" to --arm--.

Column 9, line 34, change "portion of inside the lower" to --portion of the insider of the lower--.

Column 11, line 29, change "that" to --than--.

UNITED STATES PATENT AND TRADEMARK OFFICE
CERTIFICATE OF CORRECTION

PATENT NO. : 5,772,352
DATED : June 30, 1998
INVENTOR(S) : Yasutaku FUKUMOTO, et al.

It is certified that error appears in the above-indentified patent and that said Letters Patent is hereby corrected as shown below:

Column 11, line 52, change "portion:" to --portion;--.

Column 11, line 54, change "therebetween said" to --therebetween, said--.

Signed and Sealed this

Twenty-first Day of March, 2000

*Attest:*

Q. TODD DICKINSON

*Attesting Officer*   Commissioner of Patents and Trademarks